United States Patent
Matsumoto

(10) Patent No.: US 11,048,385 B2
(45) Date of Patent: Jun. 29, 2021

(54) SELF-ORDER PROCESSING SYSTEM AND CONTROL PROCESSING METHOD

(71) Applicant: TOSHIBA TEC KABUSHIKI KAISHA, Tokyo (JP)

(72) Inventor: Yuki Matsumoto, Tagata Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/710,476

(22) Filed: Dec. 11, 2019

(65) Prior Publication Data

US 2020/0264737 A1 Aug. 20, 2020

(30) Foreign Application Priority Data

Feb. 14, 2019 (JP) .............................. JP2019-024603
Sep. 19, 2019 (JP) .............................. JP2019-169985

(51) Int. Cl.
*G06F 3/0482* (2013.01)
*G06Q 50/12* (2012.01)
*G06Q 30/06* (2012.01)
*G06F 3/0484* (2013.01)

(52) U.S. Cl.
CPC ........ *G06F 3/0482* (2013.01); *G06F 3/04847* (2013.01); *G06Q 30/0633* (2013.01); *G06Q 50/12* (2013.01)

(58) Field of Classification Search
CPC .............. G06F 3/0482; G06F 3/04847; G06F 3/04845; G06F 3/0486; G06F 3/04883; G06Q 30/0633; G06Q 50/12
See application file for complete search history.

(56) References Cited

U.S. PATENT DOCUMENTS

| | | | | |
|---|---|---|---|---|
| 7,454,370 B2* | 11/2008 | Baril | ...................... | G06Q 20/20 186/38 |
| 8,494,896 B1* | 7/2013 | Lagana | .................. | G06Q 10/10 705/7.29 |
| 8,660,906 B2* | 2/2014 | Woycik | ............... | G06Q 20/367 705/26.1 |
| 2002/0032667 A1* | 3/2002 | Walker | .................... | G07F 9/026 705/400 |
| 2004/0069313 A1* | 4/2004 | DeLaquil | ............... | G06Q 10/10 705/15 |
| 2004/0158494 A1* | 8/2004 | Suthar | .................... | G06Q 30/06 705/15 |
| 2005/0054381 A1* | 3/2005 | Lee | ................... | H04M 1/72586 455/557 |
| 2005/0065851 A1* | 3/2005 | Aronoff | ................. | G06Q 50/12 705/15 |

(Continued)

FOREIGN PATENT DOCUMENTS

JP 2007287082 A 11/2007

*Primary Examiner* — Yongjia Pan
(74) *Attorney, Agent, or Firm* — Kim & Stewart LLP

(57) ABSTRACT

In accordance with an embodiment, a self-order processing system includes a self-order terminal and a terminal setting computer. The terminal setting computer causes a display to display an order menu layout setting screen for performing layout setting of an order menu to be displayed on the self-order terminal. In addition, the terminal setting computer presents information for assisting layout setting of the order menu to be displayed on the self-order terminal on the basis of information regarding an input at the self-order terminal.

10 Claims, 11 Drawing Sheets

(56) References Cited

U.S. PATENT DOCUMENTS

| | | | |
|---|---|---|---|
| 2008/0126985 A1* | 5/2008 | Baril | G06Q 20/40 |
| | | | 715/810 |
| 2010/0161432 A1* | 6/2010 | Kumanov | G06Q 20/102 |
| | | | 705/15 |
| 2012/0179584 A1* | 7/2012 | Woycik | G06Q 30/0601 |
| | | | 705/27.1 |
| 2013/0144730 A1* | 6/2013 | Harman | G06Q 30/0633 |
| | | | 705/15 |
| 2014/0172569 A1* | 6/2014 | Banda | G06Q 50/12 |
| | | | 705/14.55 |
| 2015/0006303 A1* | 1/2015 | Little | G06Q 30/0282 |
| | | | 705/15 |
| 2018/0018087 A1* | 1/2018 | Matsumoto | G06Q 30/0643 |

* cited by examiner

DATA TABLE OF ARTICLE INFORMATION 172A

| MENU CODE | ARTICLE NAME | PRICE | THUMBNAIL IMAGE |
|---|---|---|---|
| 00604 | AAA | 350 | AAA.jpg |

Fig.3A

DATA TABLE OF CUSTOMER INFORMATION 152A

| SLIP NUMBER | NUMBER OF CUSTOMER | CUSTOMER CLASS | ENTERING TIME | EXITING TIME |
|---|---|---|---|---|
| 1234 | 8 | ELDERLY MALE | 18:30 | 20:30 |

Fig.3B

DATA TABLE OF ORDER INFORMATION  172B (152B)

| SLIP NUMBER | COURSE NUMBER | PAGE NUMBER | MENU CODE | CATEGORY NUMBER | SENDING TIME |
|---|---|---|---|---|---|
| 1234 | ○○ | △△ | 00604 | ◇◇ | 18 : 30 |

Fig.3C

DATA TABLE OF OPERATION INFORMATION  172C

| SLIP NUMBER | COURSE NUMBER | PAGE NUMBER | TOUCH BUTTON INFORMATION | COORDINATES INFORMATION |
|---|---|---|---|---|
| 1234 | ○○ | △△ | □□ | XX, YY |

Fig.3D

SELF-ORDER PROCESSING SYSTEM AND CONTROL PROCESSING METHOD

CROSS-REFERENCE TO RELATED APPLICATION

This application is based upon and claims the benefit of priority from Japanese Patent Application No. 2019-024603, filed on Feb. 14, 2019, and also Japanese Patent Application No. 2019-169985, filed on Sep. 19, 2019, the entire contents each of which are incorporated herein by reference.

FIELD

An embodiment described here generally relates to a self-order processing system and a control processing method.

BACKGROUND

There has been a demand for reducing labor costs and the like in an eating place such as a restaurant. Moreover, a self-order terminal (tablet terminal) has been developed in order to reduce the burden on a staff. The self-order terminal (tablet terminal) is provided on each table. A customer can order by himself or herself through the self-order terminal (tablet terminal).

With the self-order terminal, the layout of menus of a lunch course, a dinner course, and the like can be arbitrarily set (changed) in a manner that depends on scenes. The layout setting depends on a subjective sensation of a restaurant manager or the like. For example, layout to arrange recommended articles in a most outstanding area of the top page or the like is set in the menu item. However, the menu layout cannot be optimized only by the subjective sensation of the restaurant manager or the like because the preferences of customers have been diversified. Moreover, the optimal menu layout also depends on situations of the restaurant.

BRIEF DESCRIPTION OF THE DRAWINGS

FIG. 3A is a diagram showing a data table of article information according to the embodiment.

FIG. 3B is a diagram showing a data table of customer information according to the embodiment.

FIG. 3C is a diagram showing a data table of order information according to the embodiment.

FIG. 3D is a diagram showing a data table of operation information according to the embodiment.

DETAILED DESCRIPTION

In accordance with one embodiment, a self-order processing system includes a menu server, a self-order terminal, a collection server, and a terminal setting computer. The menu server gathers information regarding an article. The self-order terminal displays an order menu based on the information regarding the article on a first display and accepts an input (user input) of an order of an article, the input being made by a user. The collection server receives, from a self-order terminal, information regarding the input accepted by the self-order terminal and stores the received information regarding the input. The terminal setting computer performs layout setting of the order menu to be displayed on the first display of the self-order terminal. In addition, the terminal setting computer includes a communication interface, a second display, and a processor. The communication interface performs data communication with the menu server and the collection server. The second display displays an order menu layout setting screen for performing layout setting of the order menu. The processor acquires the information regarding the article from the menu server via the communication interface and acquires the information regarding the input from the collection server. The processor causes the second display to display the order menu layout setting screen on the basis of the acquired information regarding the article and the acquired information regarding the input. In addition, the processor causes the second display to display the order menu layout setting screen and presents information for assisting layout setting of the order menu to be displayed on the self-order terminal on the basis of the acquired information regarding the input.

Figure 1:
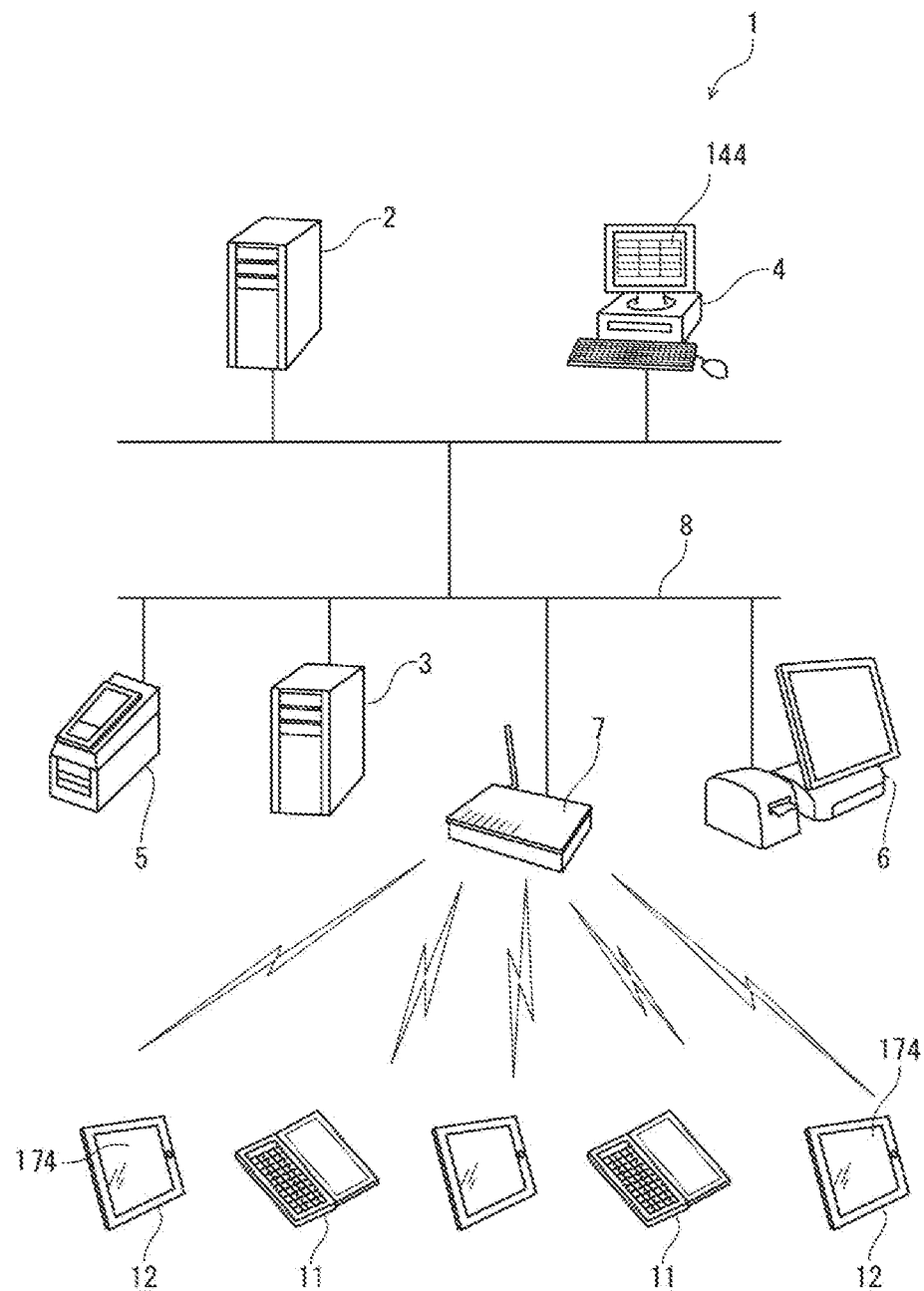
FIG. 1 is a schematic diagram showing a configuration example of a self-order processing system according to an embodiment.
Figure 2:
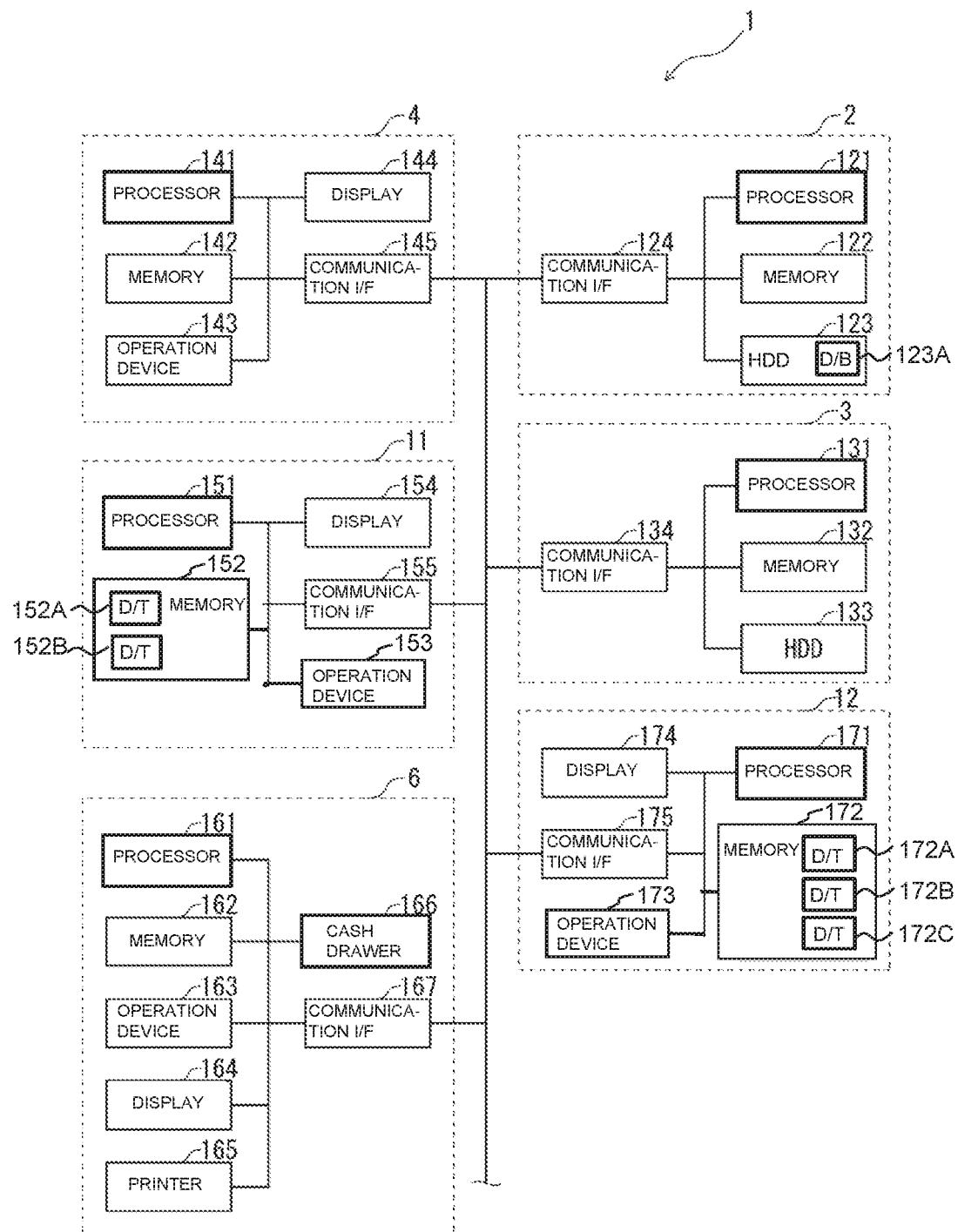
FIG. 2 is a diagram showing a main hardware configuration of the self-order processing system according to the embodiment.

Hereinafter, a self-order processing system 1 according to an embodiment will be described with reference to the drawings. In the drawings, repeated symbols denote identical or similar parts. FIG. 1 schematically shows a configuration example of the self-order processing system 1 according to the embodiment. FIG. 2 shows a main hardware configuration of the self-order processing system 1. FIG. 3A shows a data table of article information. FIG. 3B shows a data table of customer information. FIG. 3C shows a data table of order information. FIG. 3D shows a data table of operation information.

The self-order processing system 1 forms a part of an order and check-out system to be used for ordering and checking out food and drinks at a bistro, for example. The self-order processing system 1 includes a menu server 2, a collection server 3, a control station 4, a kitchen printer 5, a POS register 6, and a wireless communication unit 7 as shown in FIG. 1. Those apparatuses 2 to 7 are connected to one another via communication lines 8 such as a wired LAN.

The menu server 2 is a computer server that gathers information regarding articles included in a menu item offered at a restaurant (hereinafter, referred to as article information). Specifically, the menu server 2 includes a processor 121, a memory 122, a hard disk 123, a communication interface (communication I/F) 124, and the like. The processor 121 is an arithmetic processing unit including a central processing unit (CPU), a read only memory (ROM), and a random access memory (RAM), for example. The memory 122 stores a control program for comprehensively controlling operations of the respective units of the menu server 2. The processor 121 controls operations of the respective units of the menu server 2 by executing the control program stored in the memory 122, for example. Moreover, the memory 122 stores an application for gathering such article information. The processor 121 gathers all pieces of article information of a menu item offered at the restaurant by executing the application stored in the memory 122. The hard disk 123 stores a menu database 123A in which the gathered article information has been registered. The article information includes a menu code, an article name, a price, a thumbnail image, and the like as shown in FIG. 3A, for example. The communication I/F 124 performs data communication with the control station 4 and the collection server 3 via the communication lines 8 (see FIG. 1). The communication I/F 124 sends the article information registered in the menu database 123A to the collection server 3. Moreover, the communication I/F 124 sends the article information registered in the menu database 123A to the control station 4.

The collection server 3 is a computer server that processes information regarding an input acquired from one of self-order terminals 12 to be described later or the like (hereinafter, simply referred to as input information). The input information is information input into the self-order terminal 12. The input information includes information regarding an order of an article by a customer (hereinafter, simply referred to as order information) and information regarding a customer's operation on the self-order terminal (hereinafter, simply referred to as operation information). Moreover, the collection server 3 performs processing of receiving the input information, gathering the input information, and providing the kitchen printer 5 and the POS register 6 with the order information included in the input information. Specifically, the collection server 3 includes a processor 131, a memory 132, a hard disk 133, and a communication interface (communication I/F) 134, and the like. The processor 131 is an arithmetic processing unit including a CPU, a ROM, and a RAM, for example. The memory 132 stores a control program for comprehensively controlling operations of the respective units of the collection server 3. The processor 131 controls operations of the respective units of the collection server 3 by executing the program stored in the memory 132. Moreover, the memory 132 stores an application for processing the input information acquired from the self-order terminal 12 or the like. The processor 131 performs the following processing by executing the application stored in the memory 132. For example, the processor 131 gathers the input information acquired from the self-order terminal 12. The hard disk 133 retains the gathered input information. More specifically, the processor 131 adds article information to the order information included in the input information. The processor 131 also adds customer information to be described later to the operation information included in the input information. The hard disk 133 stores the input information including the order information to which the article information has been added and the operation information to which the customer information has been added. Moreover, the processor 131 determines an order tendency on the basis of the order information and the operation information. For example, the processor 131 subjects the order information included in the input information to data analysis (e.g., statistical processing), to thereby determine the number of orders or an amount sold of each of the articles included in the menu, for example. Moreover, for example, the processor 131 subjects the operation information included in the input information to data analysis (e.g., statistical processing), to thereby determine a display area in which an order frequency is higher on an order menu screen E to be described later, for example. The communication I/F 134 performs data communication with the menu server 2, the control station 4, the kitchen printer 5, and the POS register 6 via the communication lines 8 (see FIG. 1). The communication I/F 134 also performs data communication with handy terminals 11 and the self-order terminals 12 via the wireless communication unit 7 and the communication lines 8. The communication I/F 134 receives article information registered in the menu database 123A (see FIG. 2) of the hard disk 123 from the menu server 2 for processing of the processor 131. The communication I/F 134 also receives the order information and the operation information from the self-order terminal 12 for processing of the processor 131. The communication I/F 134 also receives the order information and the customer information from the handy terminals 11 for processing of the processor 131. Moreover, the communication I/F 134 sends to the control station 4 the order information to which the article information has been added by the processor 131 and the operation information to which the customer information has been added by the processor 131. The communication I/F 134 also sends to the control station 4 the above-mentioned information regarding the number of orders or the amount sold of each article, which has been determined by the processor 131, and the information regarding the display area in which the order frequency is higher, which has been determined by the processor 131. The communication I/F 134 also sends the order information to which the article information has been added by the processor 131 to the kitchen printer 5 and the POS register 6.

The control station (terminal setting computer) 4 is an order management computer that controls the entire self-order processing system 1. The control station 4 is a computer operated by an operator (manager such as a restaurant manager) in order to perform layout setting of the order menu to be displayed on a display (see a display 174 to be described later) of the self-order terminal 12 to be described later. Specifically, the control station 4 includes a processor 141, a memory 142, an operation device 143 (keyboard, mouse), a display 144, and a communication interface (communication I/F) 145, and the like. The processor is an arithmetic processing unit including a CPU, a ROM, and a RAM, for example. The memory 142 stores a control program for comprehensively controlling operations of the respective units of the control station 4. The processor 141 controls operations of the respective units of the control station 4 by executing the control program stored in the memory 142. Moreover, the memory 142 stores an application (order menu layout setting application) for performing layout setting of the order menu screen E of the self-order terminal 12. The processor 141 executes the application stored in the memory 142 to thereby perform processing for layout setting of the order menu. That is, the processor 141 displays an order menu layout setting screen D including a menu list D11 and a layout list D21 on the display 144. The processor 141 presents information for assisting layout setting of the order menu (hereinafter, simply referred to as assist information) to the operator via the order menu layout setting screen D along with the display of the order menu layout setting screen D. The processor 141 detects an operator's operation on the order menu layout setting screen D and changes the layout list D21 corresponding to layout of articles on the order menu screen E of the self-order terminal 12. Specifically, the processor 141 subjects the input information and the like acquired from the collection server 3 to data analysis to thereby determine an order tendency and the like. The processor 141 presents the above-mentioned assist information to the operator on the basis of this data analysis result. For example, the memory 142 prestores example sentences of a plurality of messages. The processor 141 determines message contents in accordance with the order tendency and displays a message obtained by combining example sentences of messages stored in the memory 142 on the order menu layout setting screen D of the display 144. It should be noted that details of the assist information will be described later. Moreover, the processor 141 acquires all the pieces of article information from the menu database 123A (see FIG. 2) of the menu server 2 in order to generate the menu list D11. The processor 141 generates a menu list D11 on the basis of the acquired article information. Moreover, the processor 141 acquires the information regarding the number of orders or the amount sold of each article from the collection server 3 in order to generate the menu list D11. The processor 141 generates a menu list D11 by rearranging the articles in the menu list D11 in the descending order of the number of orders or the descending order of the amount sold on the basis of the above-mentioned information regarding the number of orders or the amount sold of each article. Moreover, the processor 141 acquires the input information from the collection server 3 and subjects data analysis to the acquired input information in order to generate the menu list D11. The processor 141 determines well-ordered articles, an operation tendency, and the like for each course, for each time zone, or for each customer class on the basis of this data analysis result. In a case where the processor 141 detects an operator's touch operation on a section region D12 of the order menu layout setting screen D, the processor 141 generates a menu list D11 as described above by rearranging the articles in the menu list D11 in the descending order of the number of orders or the descending order of the amount sold for each course, for each time zone, or for each customer class specified by the touch operation. For example, the memory 142 stores data of the generated menu list D11 (hereinafter, simply referred to as the menu list D11). Moreover, the memory 142 stores data of the layout list D21 before layout change (hereinafter, simply referred to as the layout list D21) and stores a new layout list D21 after layout change. Under the control of the processor 141, the display 144 displays the order menu layout setting screen D including the menu list D11 and the layout list D21 stored in the memory 142 (see FIGS. 4A and 4B). The operator operates the order menu layout setting screen D. Accordingly, the operator can select an article (menu item) to be displayed on the self-order terminal 12 from among the articles registered in the menu database 123A. That is, the processor 141 causes the display 144 to display the order menu layout setting screen D, detects an operator's touch operation on the order menu layout setting screen D, and generates a new layout list D21 in the following manner. For example, the processor 141 reads out the menu list D11 and the layout list D21 stored in the memory 142 and causes the display 144 to display the order menu layout setting screen D including the menu list D11 and the layout list D21. At this time, in a case where the processor 141 detects an operator's touch operation on a category selection field D23 or D24 of the order menu layout setting screen D, the processor 141 determines that the category of articles has been selected. The processor 141 generates a layout list D21 of the articles included in the selected category on the basis of the menu list D11 stored in the memory 142. The processor 141 causes the display 144 to display the layout list D21. For example, the processor 141 detects an operator's touch operation on the menu list D11 of the order menu layout setting screen D and determines that one of the plurality of articles included in the menu list D11 has been selected. The processor 141 detects a touch operation on an addition button D3 or an insertion button D4 of the order menu layout setting screen D. The processor 141 adds the selected article included in the menu list D11 to the layout list D21 of the order menu layout setting screen D. For example, the processor 141 detects an operator's touch operation on the layout list D21 and determines that one of the plurality of articles included in the layout list D21 has been selected. The processor 141 detects an operator's touch operation on a deletion button D5 of the order menu layout setting screen D and deletes the selected article from the layout list D21. For example, the processor 141 detects an operator's touch operation (drag and drop) on the layout list D21 and changes the position of the selected article in the layout list D21. For example, the processor 141 detects an operator's operation on a size region D22 in the layout list D21 and changes the size of an article thumbnail image. In a case where the processor 141 detects an operator's touch operation on a layout change button D7 of the order menu layout setting screen D, the processor 141 determines the layout list D21 on the order menu layout setting screen D, which has been edited by article addition, article deletion, article position change, and the like, as the layout list D21 after layout change. The memory 142 newly stores the layout list D21 generated by the processor 141 in the above-mentioned manner. The communication I/F 145 performs data communication with the menu server 2 and the collection server 3 via the communication lines 8. The communication I/F 145 receives all the pieces of article information registered in the menu database 123A from the menu server 2. Moreover, the communication I/F 145 receives from the collection server 3 the order information to which the article information has been added, the operation information to which the customer information has been added, the information regarding the number of orders or the amount sold of each article, and the information regarding the order tendency. Here, the order tendency includes the information regarding the display area in which the order frequency is higher (hereinafter, referred to as display area information) in the menu area of the order menu screen E, for example. Moreover, the communication I/F 145 performs data communication with the self-order terminal 12 via the wireless communication unit 7 and the communication lines 8. The communication I/F 145 sends to the self-order terminal 12 the data of the layout list D21 and the information regarding the articles included in the layout list D21 (the article information associated with the layout list D21).

The kitchen printer 5 is a printing machine that prints and issues an order slip. The order slip is a slip for notifying a cook in the kitchen of the information regarding the article ordered by the customer. The kitchen printer 5 receives from the collection server 3 the order information to which the article information has been added. The kitchen printer 5 prints and issues the order slip.

The POS register 6 is an check-out machine placed on a check-out counter. The POS register 6 includes a processor

161 and a memory 162. The processor 161 is an arithmetic processing unit including a CPU, a ROM, and a RAM, for example. The processor 161 comprehensively controls operations of the POS register 6. The POS register 6 further includes an operation device 163, a display 164, a printer 165, a cash drawer 166, and a communication interface (communication I/F) 167, and the like. The POS register 6 receives the order information to which the article information has been added from the collection server 3 via the communication I/F 167 and performs check-out processing.

The wireless communication unit 7 is mounted on the ceiling or the like of the restaurant and performs wireless communication with the handy terminals 11 and the self-order terminals 12.

The handy terminals 11 are a plurality of small terminal devices each carried by an individual staff member. The handy terminal 11 includes a processor 151 and a memory 152. The processor 151 is an arithmetic processing unit including a CPU, a ROM, and a RAM, for example. For example, the memory 152 stores a control program for comprehensively controlling operations of the handy terminals 11. The processor 151 controls operations of the respective units of the handy terminals 11 by executing the control program stored in the memory 152. The handy terminals 11 further includes an operation device 153, a display 154, a communication interface (communication I/F) 155, and the like. The staff member inputs the customer information in the handy terminals 11. The processor 151 acquires the customer information input by the staff member via the operation device 153 or the display 154, for example. For example, the memory 152 stores a data table 152A in which the acquired customer information has been registered as shown in FIG. 3B. The customer information includes a slip number, the number of customers, a customer class, an entering time, an exiting time, and the like as shown in FIG. 3B. Moreover, the staff member inputs an order from the customer into the handy terminal 11. The processor 151 acquires the customer order information input by the staff member via the operation device 153 or the display 154, for example. For example, the memory 152 stores a data table 152B in which the acquired order information has been registered. The data table 152B is a data table similar to a data table 172B shown in FIG. 3C to be described later. The communication I/F 155 sends the information (the above-mentioned customer information and order information) input into the handy terminal 11 to the collection server 3.

The self-order terminal 12 is placed on each table of the restaurant. The self-order terminal 12 is a tablet-type terminal device with which the customer (user) can input an order by himself or herself. The self-order terminal 12 includes a processor 171 and a memory 172. The processor 171 is an arithmetic processing unit including a CPU, a ROM, and a RAM, for example. For example, the memory 172 stores a control program for comprehensively controlling operations of the self-order terminals 12. The processor 171 controls operations of the respective units of the self-order terminal 12 by executing the control program stored in the memory 172. The self-order terminal 12 further includes an operation device 173, a display 174, and a communication interface (communication I/F) 175, and the like. Touch displays into which an input is made by a touch operation are used as the operation device 173 and the display 174. Some of the articles registered in the menu database 123A (see FIG. 2) are displayed on the display 174 as the order menu (order menu screen E). This order menu is generated in such a manner that the operator (manager such as a restaurant manager) operates the order menu layout setting screen D of the control station to thereby select an arbitrary article from the articles registered in the menu database 123A. Specifically, the processor 171 acquires the data of the layout list D21 and the article information from the control station 4. Here, the article information is part of the article information registered in the menu database 123A. Specifically, the article information is the information regarding the articles included in the layout list D21 (the article information associated with the layout list D21). The processor 171 causes the display 174 to display the order menu screen E on the basis of the acquired data of the layout list D21 and the acquired article information. For example, as shown in FIG. 3A, the memory 172 stores a data table 172A in which the acquired article information has been registered. As shown in FIG. 3A, the article information includes a menu code, an article name, an article price, and an article thumbnail image. Moreover, the customer can select and order a favorable article in accordance with a touch operation on the order menu screen E. The processor 171 acquires the order information from the customer via the display 174. For example, the memory 172 stores the data table 172B in which the acquired order information has been registered as shown in FIG. 3C. As shown in FIG. 3C, the order information includes a slip number, a course number, a the page number on the order menu screen E, a menu code, a category number, and a sending time. Moreover, the processor 171 gathers customer's operation information on the order menu screen E. For example, the memory 172 stores a data table 172C in which the gathered operation information has been registered as shown in FIG. 3D. As shown in FIG. 3D, the operation information includes a slip number, a course number, a page number, a touch button information on the order menu screen E, and coordinates information on the order menu screen E. The communication interface 175 performs data communication with the collection server 3 and the control station 4 via the wireless communication unit 7 and the communication lines 8. The communication interface 175 receives the data of the layout list D21 and the article information associated with the layout list D21 from the control station 4. Moreover, the communication interface 175 sends the information (the order information and the operation information) input into the self-order terminal 12 to the collection server 3.

The number of kitchen printers 5, the number of wireless communication units 7, the number of handy terminals 11, and the number of self-order terminals 12 are all arbitrarily set.

Figure 4A:
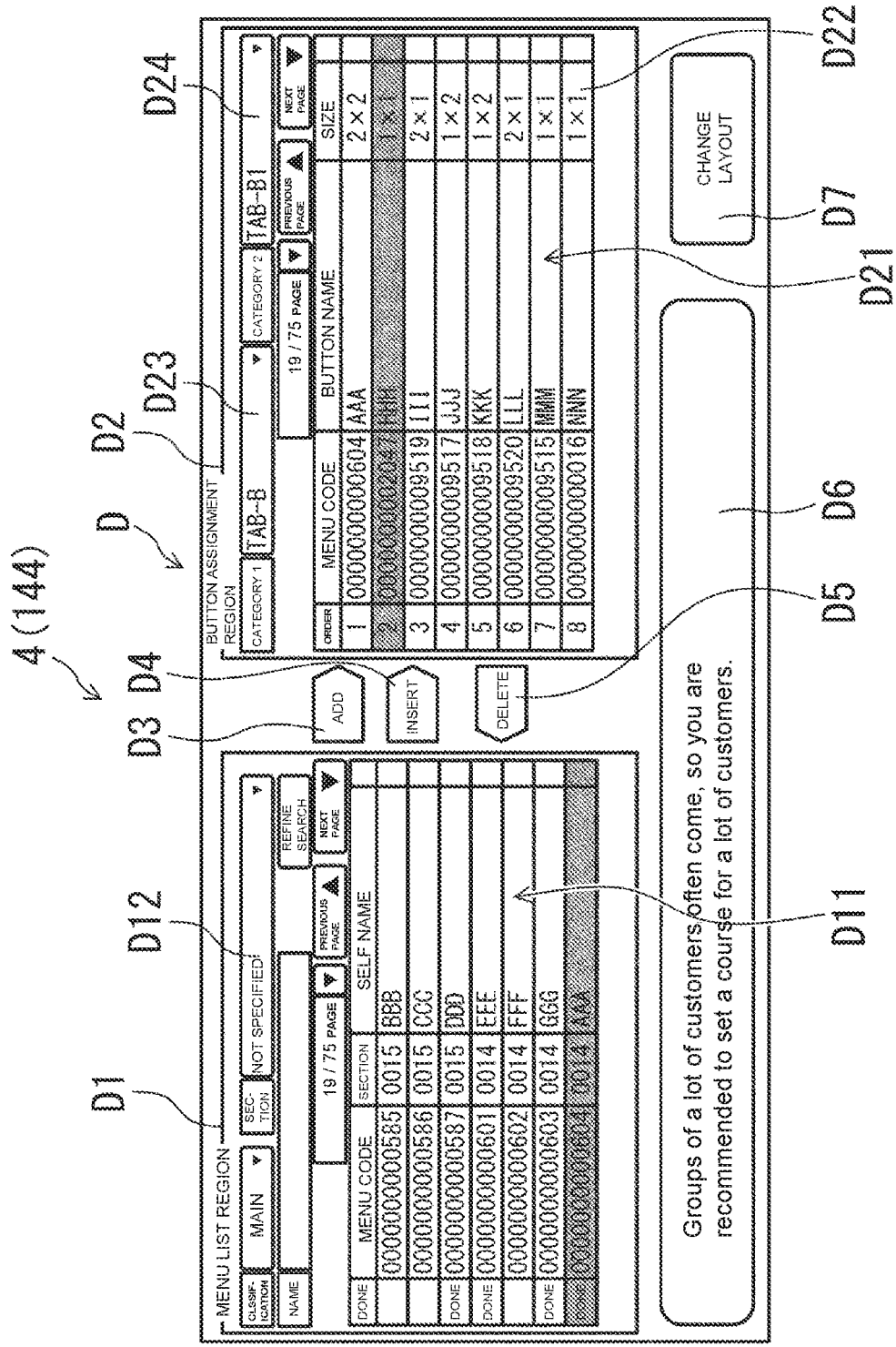
FIG. 4A is a diagram showing an example of an order menu layout setting screen before layout change, which is displayed by a control station according to the embodiment.
Figure 5A:
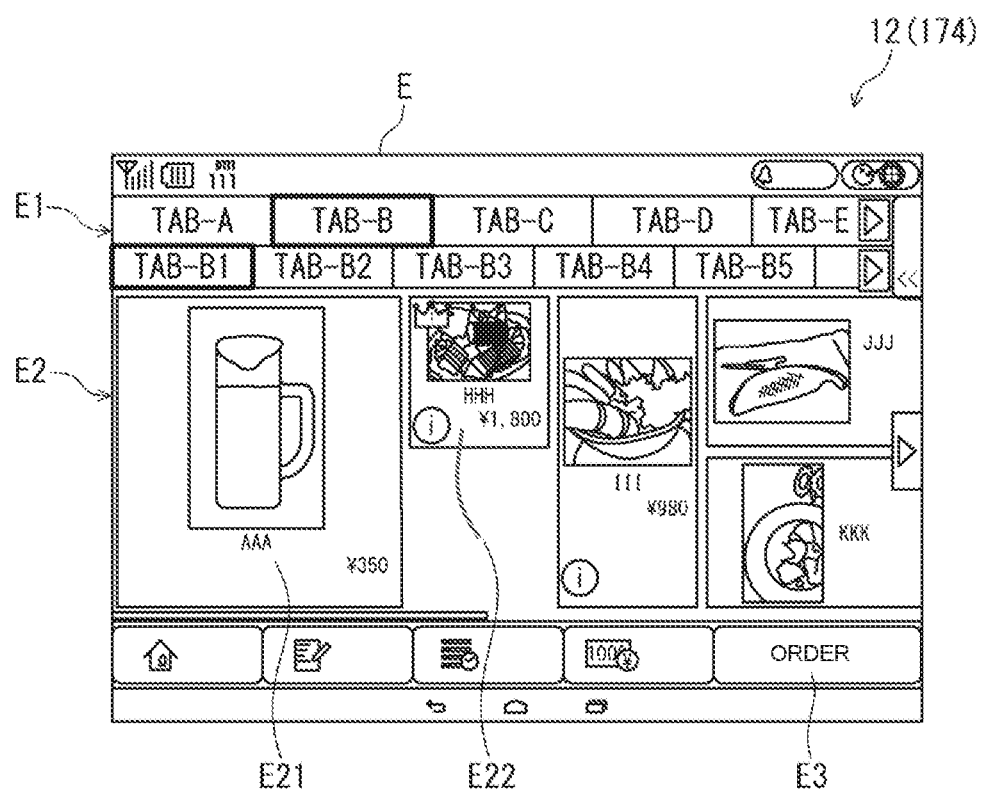
FIG. 5A is a diagram showing an example of an order menu screen before layout change, which is displayed by a self-order terminal according to the embodiment.

FIG. 4A shows an example of the order menu layout setting screen D before layout change, which is displayed on the control station 4. FIG. 5A shows an example of the order menu screen E (order menu) before layout change, which is displayed on the self-order terminal 12 according to the embodiment.

As described above, the control station 4 is capable of performing layout setting of the order menu screen E (order menu) of the self-order terminal 12. Specifically, the control station 4 rearranges and replaces the articles of the layout list D21 in such a manner that the operator (e.g., a manager such as a restaurant manager) operates the order menu layout setting screen D (screen according to the order menu layout setting application) displayed on the display 144 by using the menu list D11 of the menu list region D1, the assist information, and the like as a reference. The processor 141 generates a menu list D11 on the basis of the articles registered in the menu database 123A (see FIG. 2) as described above and saves the generated menu list D11 in the memory 142. The layout of the order menu to be displayed on the self-order terminal 12 is thus set (changed).

The display 174 of the self-order terminal 12 displays the order menu screen E in which the thumbnail images of the order menu (images of articles) are arranged in the tiled display format or the menu book format. A plurality of tabs E1 is displayed in an upper portion of the order menu screen E. The operator can switch the category of articles such as food and drinks by selecting each of the plurality of tabs E1.

As shown in FIG. 4A, a menu list region D1 is displayed on the left-hand side of the order menu layout setting screen D. The menu list D11 is displayed in the menu list region D1. The menu list D11 is a list of articles which is a base for adding (or inserting) an article to the layout list D21 to be described later and includes information regarding all the articles included in the menu database 123A (see FIG. 2). The menu list D11 includes at least the menu codes (see FIG. 3A) and self-names of the plurality of articles as shown in FIG. 4A, for example. The self-name is a name of the article displayed on the order menu screen E of the self-order terminal 12 and is an article name (see FIG. 3) corresponding to the menu code. Moreover, the section region D12 is displayed in an upper portion of the menu list D11. The section region D12 is a region to be operated when sorting the articles included in the menu list D11 for each course, for each time zone, or for each customer class. Moreover, a button assignment region D2 is displayed on the right-hand side of the order menu layout setting screen D. The layout list D21 is displayed in the button assignment region D2. The layout list D21 includes the articles to be displayed on an order display screen E of the self-order terminal 12 and is a list for determining the position (display order) of the display area (e.g., E22 or the like) of the article in a menu area E2 of the order display screen E and the size of the article thumbnail image. For example, the layout list D21 includes the menu code (see FIG. 3A) and the button name as shown in FIG. 4A and includes a size field D22. As will be described later, the function of the button for selecting the article is assigned to the display area in an order area E2 of the order display screen E. The button name is a name of a button assigned to the display area and is the same as the article name (e.g., "AAA"). Moreover, the layout list D21 is a list in which the articles in the display area are arranged while those are made to correspond to the layout (display order) in the order area E2 of the display area. Here, in the layout list D21, for example, the "order" shown in FIG. 4A is the arrangement order of the articles in the layout list D21 and shows the layout (display order) in the order area E2 of the display area of that article. For example, a display area E21 having a button name (article name) "AAA" whose "order" is "1" is displayed at the first place from the left in the order area E2 (e.g., see FIG. 5A). Moreover, in the display area to which the button is assigned, the article thumbnail image is displayed together with the article name (button name) and the unit price of the article (e.g., see FIG. 5A). The information indicating the size of the thumbnail image is displayed in the size field D22 of the layout list D21. Moreover, the category selection fields D23 and D24 at two positions are displayed in an upper portion of the layout list D21, for example. The category selection field D23 or D24 is a region for selecting the course or the category of articles such as food and drinks. The category selection field D23 is a region on which an operation is to be made for selecting a superordinate category. The category field D24 is a region on which an operation is to be made for selecting a subordinate category of the category selected in the category selection field D23. For example, in FIG. 4A, the category "TAB-B" is selected as the superordinate category and the category "TAB-B1" is selected as the subordinate category. Moreover, the addition button D3, the insertion button D4, and the deletion button D5 are displayed at the center of the order menu layout setting screen D. In addition, a message field D6 and the layout change button D7 are displayed in a lower portion of the order menu layout setting screen D.

The operator clicks (selects) the article name "AAA" in the menu list D11 of the menu list region D1 on the order menu layout setting screen D before layout change as shown in FIG. 4A, for example. The article name "AAA" of the menu list D11 is displayed in color (in gray in FIG. 4A) or displayed in an inverted state such that the article name "AAA" can be identified. The operator operates the addition button D3 or the insertion button D4 to cause the article name "AAA" to be displayed in the layout list D21 of the button assignment region D2. In addition, the operator drags and drops the article name "AAA" of the layout list D21 to arrange the article name "AAA" in the most superordinate (uppermost) place of the layout list D21 of the button assignment region D2. As described above, when the operator adds the article name to the layout list D21 and rearranges the added article on the basis of the menu list D11, the thumbnail image of the article having the article name "AAA" is displayed on the order menu screen E of the self-order terminal 12 as shown in FIG. 5A. That is, the thumbnail image of the article having the article name "AAA" is displayed in the display area E21 on the leftmost place (from the first place from the left) of the menu area E2 of the order menu screen E. The size of the thumbnail image of each menu item (article) displayed in the menu area E2 of the order menu screen E can be arbitrarily changed by operating the size field D22 of the layout list D21 of the button assignment region D2. Moreover, the operator can set (change) the layout for each of a plurality of categories of articles such as food and drinks. That is, the operator can operate the category selection field D23 or D24 of the button assignment region D2 and select each category.

The customer touches or swipes the order menu screen E displayed on the order menu screen E of the self-order terminal 12 and finds a menu item (article) that the customer wishes to order. The customer touches the thumbnail image of the menu item (e.g., the article having the article name "AAA") that the customer wishes to order in the menu area E2. When the customer touches the thumbnail image, the touched menu item is selected such that the order can be performed. When the customer touches an order button E3, the order information is sent to the collection server 3. Contents (operation information) when the customer operates the self-order terminal 12 is also sent to the collection server 3 at the same time. That is, the input information (order information, operation information) of the self-order terminal 12 is sent to the collection server 3.

The order information is information regarding the article ordered by the customer. The order information includes information regarding the slip number, the course number, the page number, the menu code, the category number, and the sending time, and the like as described above (see FIG. 3C). The order information is associated with the article information registered in the menu database 123A of the menu server 2 in the collection server 3. For example, the processor 131 of the collection server 3 determines the article ordered by the customer from the menu code included in the order information. That is, the processor 131 acquires the article information including the menu code identical to the menu code included in the order information from the menu database 123A of the menu server 2 via the communication I/F 134. The collection server 3 adds the acquired article information to the order information as described above. More specifically, the order information to which the article information has been added is information including the slip number, the course number, the page number, the menu code, the category number, the sending time, the article name, the price, and the thumbnail image. The processor 131 stores the order information to which the article information has been added in the hard disk 133 of the collection server 3 (see Step S0 of FIG. 6). Moreover, the processor 131 sends, as described above, the order information to which the article information has been added to the kitchen printer 5 and the POS register 6 via the communication I/F 134. In addition, as described above, the processor 131 also sends the order information to which the article information has been added to the control station 4 via the communication I/F 134. It should be noted that the collection server 3 may further associate the order information with the customer information on the basis of the slip number. For example, the processor 131 of the collection server 3 determines customer information including the slip number identical to the slip number included in the order information. The processor 131 may add the determined customer information to the order information to which the article information has been added.

The operation information is so-called operation log information. The operation information includes the slip number, the course number, the page number, the touch button information, the coordinates information, and the like (see FIG. 3D). The operation information is associated with the customer information input from the handy terminal 11 in the collection server 3. That is, the processor 131 of the collection server 3 determines operation information and customer information having the identical slip number. As described above, the processor 131 adds the determined customer information to the operation information. Specifically, the operation information to which the customer information has been added is information including the slip number, the course number, the page number, the touch button information, the coordinates information, the number of customers, the customer class, the entering time, and the exiting time. The processor 131 stores the operation information to which the customer information has been added in the hard disk 133 of the collection server 3 (see Step S0 of FIG. 6). In addition, as described above, the processor 131 sends the operation information to which the customer information has been added to the control station 4 via the communication I/F 134.

[Layout Change of Order Menu Item]

Figure 4B:
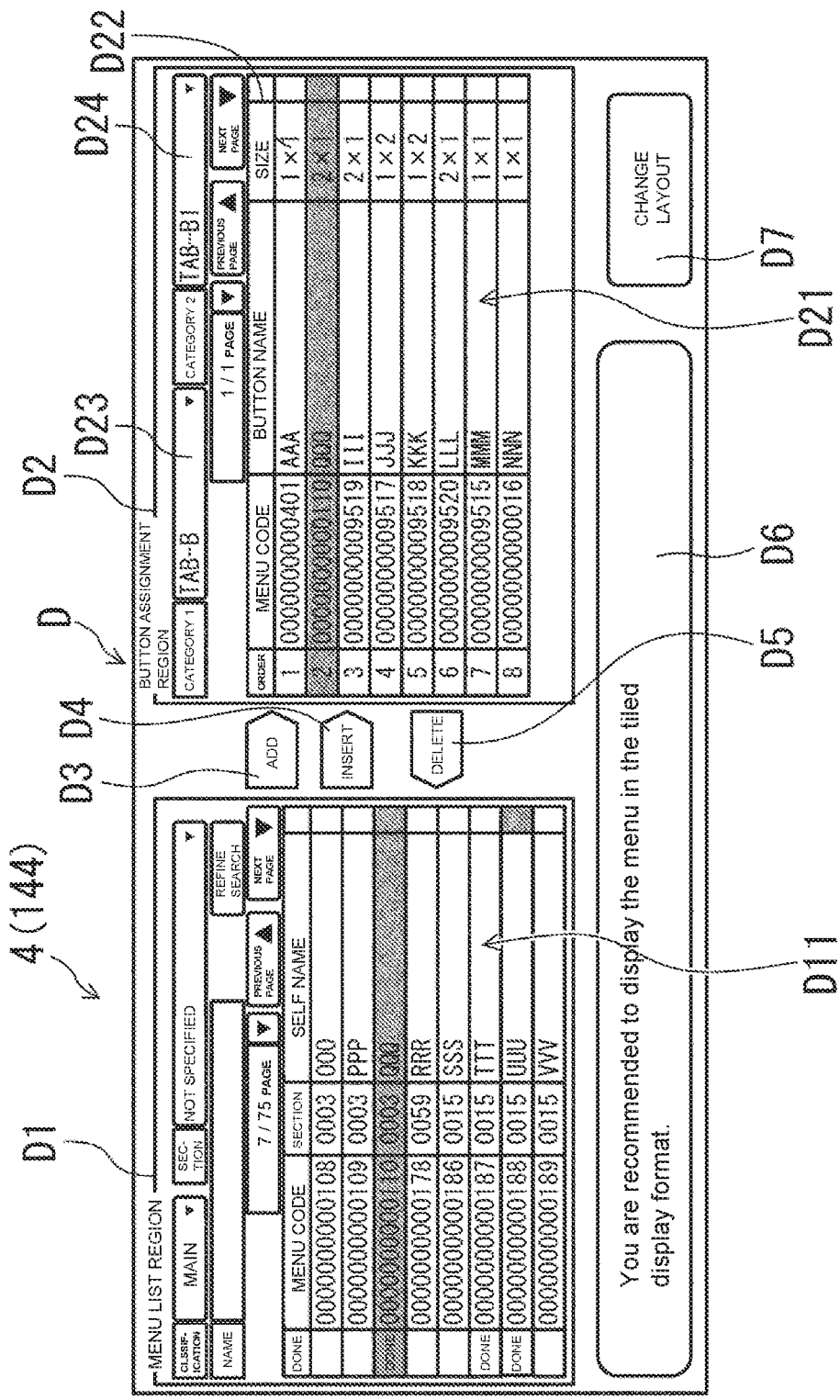
FIG. 4B is a diagram showing an example of the order menu layout setting screen after layout change, which is displayed by the control station according to the embodiment.
Figure 5B:
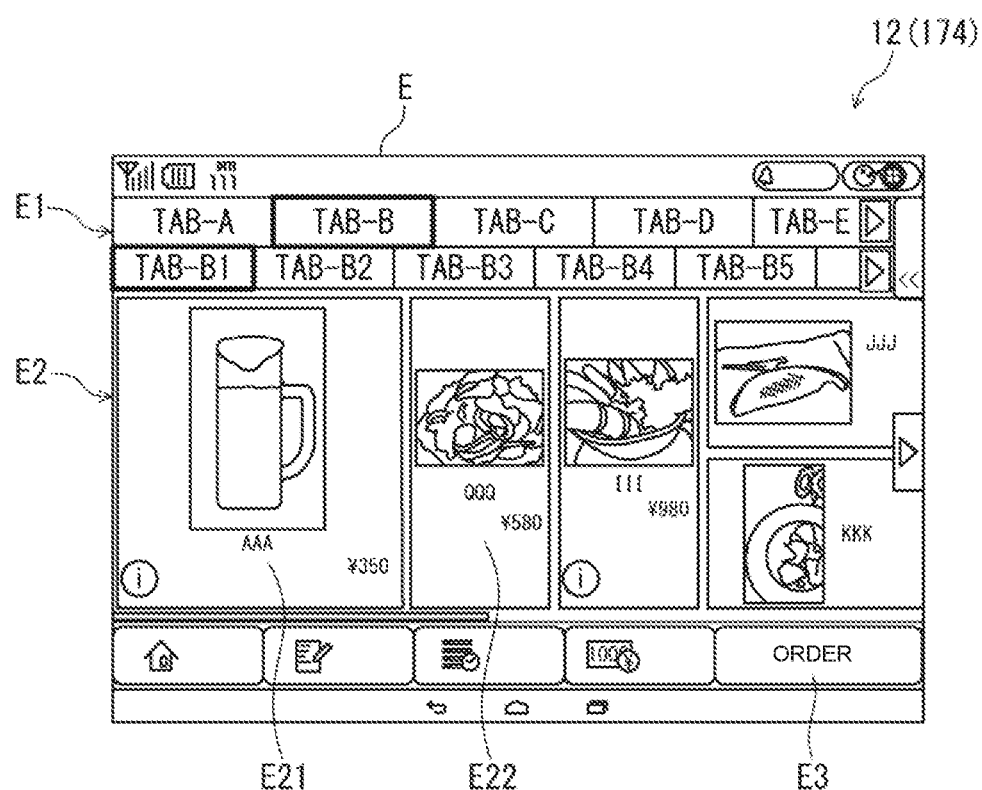
FIG. 5B is a diagram showing an example of the order menu screen after layout change, which is displayed on the self-order terminal according to the embodiment.
Figure 6:
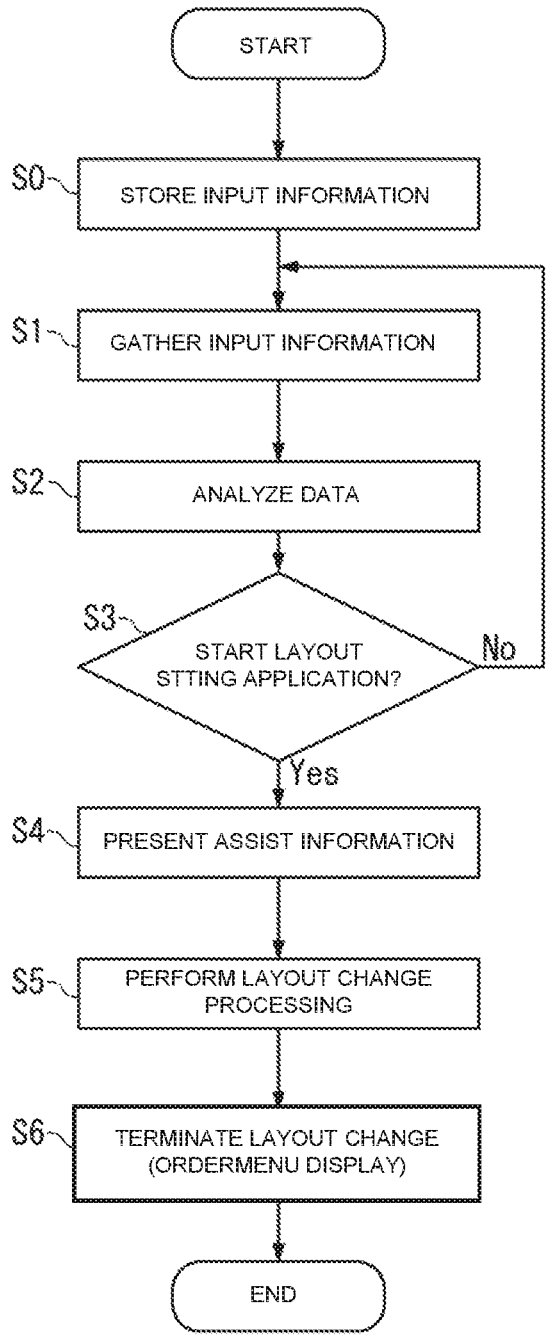
FIG. 6 is a flowchart showing control processing of order menu layout change according to the embodiment.

FIG. 4B shows an example of the order menu layout setting screen after layout change, which is displayed on the control station 4. FIG. 5B shows an example of the order menu screen after layout change, which is displayed on the self-order terminal 12 at the time of layout change of the order menu. FIG. 6 shows control processing for changing the layout of the order menu.

In Step S0 of FIG. 6, the processor 131 of the collection server 3 stores the input information including the order information to which the article information has been added and the operation information to which the customer information has been added in the hard disk 123. In Step S1, the processor 141 of the control station 4 gathers the input information from the collection server 3 via the communication I/F 145. In Step S2, the processor 141 performs data analysis (statistical processing) on the gathered input information. For example, the processor 141 statistically processes the following input information on a course basis. That is, the processor 141 statistically processes the type (food, drinks, etc.) of the articles included in the menu, the unit price of the articles included in the menu, the customer class (sex, age) on a table basis, the slip number (table number), the entering time, the exiting time, and the like. Moreover, the processor 141 also statistically processes the following input information. That is, the processor 141 statistically processes the number of operations of the self-order terminal 12, the number of swipe operations, the time interval between the touch operation and the touch operation, and the like. The processor 141 determines well-ordered articles, an operation tendency of the self-order terminal 12, and the like for each course, for each time zone, or for each customer class by such data analysis (statistical processing).

In Step S3, the processor 141 of the control station 4 determines whether or not an instruction to start the order menu layout setting application has been accepted. In a case where the processor 141 determines that the instruction to start the order menu layout setting application has not been accepted (Step S3: No), the processing of the processor 141 returns to Step S1. That is, the processor 141 of the control station 4 maintains the current order menu layout until the processor 141 starts the order menu layout setting application. Moreover, in a case where the processor 141 determines that the instruction to start the order menu layout setting application has been accepted, the processor 141 starts the order menu layout setting application (Step S3: Yes). When the processor 141 starts the order menu layout setting application, the processing of the processor 141 proceeds to Step S4. In Step S4, the processor 141 presents information (assist information) for assisting layout setting of the order menu on the basis of the data analysis (statistical processing) along with the display of the order menu layout setting screen D.

Specifically, first of all, the processor 141 displays on the display 144 the order menu layout setting screen D including the menu list D11 and the layout list D21. The processor 141 accepts an operation made by the operator (manager such as a restaurant manager) via the order menu layout setting screen D. In accordance with the operator's operation, the processor 141 changes the menu list D11 and the layout list D21 on the order menu layout setting screen D and displays the changed menu list D11 and the changed layout list D21. For example, the operator makes an operation to select a course (lunch course, dinner course, or the like) and a plurality of categories of articles such as food and drinks on the order menu layout setting screen D. Each category is selected by operating the category selection field D23 or D24 of the button assignment region D2. The processor 141 detects an operator's operation on the category selection field D23 or D24 of the button assignment region D2. The processor 141 detects the operator's operation to thereby accept a selection of the category. When the processor 141 accepts the selection of the category, the processor 141 displays the menu list D11 corresponding the selected category in a menu list region D1 as shown in FIG. 4A. Moreover, at this time, the processor 141 sorts the menu items (articles) included in the menu list D11, for example, in the descending order of the number of orders or the descending order of the amount sold and displays the menu list D11 (presentation of assist information). That is, the processor 141 classifies respective articles in view of the number of orders or the amount sold and displays the classified articles in the menu list D11 (presentation of assist information). Here, the collection server 3 statistically processes the order information as described above, to thereby determine the number of orders or the amount sold of each menu item. The processor 141 of the control station 4 displays the menu item (article) having a larger number of orders or a higher amount sold at a more superordinate level of the menu list D11. Moreover, the processor 141 detects an operator's operation on a section field D12. When the processor 141 detects the operator's operation, the processor 141 sorts the articles included in the menu list D11 in the descending order of the number of orders or the descending order of the amount sold for each course, for each time zone, or for each customer class and displays the menu list D11. That is, the operator can also display the menu list D11 in which the articles included in the menu list D11 are sorted in the descending order of the number of orders or the descending order of the amount sold for each course, for each time zone, or for each customer class by operating the section field D12 of the menu list region D1.

Moreover, the processor 141 displays, as shown in FIG. 4A, the article at a place (display area) in which the order frequency is higher on the order menu screen E in the layout list D21 of the button assignment region D2 in color, in an inverted state, or the like such that the article can be identified (presentation of assist information). For example, the processor 141 displays the second position from the top of the layout list D21 in color (in gray in FIG. 4A). That is, the layout list D21 on the order menu layout setting screen D of FIG. 4A indicates a higher frequency of the touch operation on the display area E22 of the article name (button name) "HHH" arranged (assignment of the button function) in the second place from the left of the menu area E2 on the order menu screen E of FIG. 5A and a larger number of orders of the article having the article name "HHH" (display area information). The display area in which the order frequency is higher on the order menu screen E of the self-order terminal 12 is determined by the collection server 3 as described above. That is, the arithmetic processor 131 of the collection server subjects the operation information to data analysis (statistical processing), to thereby determine an area in which the order frequency is higher on the order menu screen E.

Next, in Step S5 of FIG. 6, the processor 141 performs processing for changing the layout of the order menu in accordance with an operation of the operator (manager such as a restaurant manager) on the order menu layout setting screen D. The processor 141 detects an operator's operation (touch operation or click operation) in the menu list D11 of the menu list region D1 of the order menu layout setting screen D, for example. The processor 141 accepts a selection of an arbitrary article (menu item) in the menu list D11 by detecting this operator's operation. Moreover, the processor 141 detects an operation (touch operation or click operation) made by the operator on the addition button D3 or the insertion button D4. The processor 141 displays the selected article (menu item) in the layout list D21 of the button assignment region D2 by detecting this operator's operation. Moreover, the processor 141 detects an drag and drop operation made by the operator in the layout list D21. The processor 141 changes and displays the position of the article in the layout list D21 by detecting this operator's operation. For example, the operator can select an arbitrary article from the menu list D11 of the menu list region D1 on the order menu layout setting screen D and arrange the article in the second place from the top of the layout list D21 of the button assignment region D2. Specifically, in a case where the operator wishes to promote the amount sold of the article having the article name "QQQ", the operator clicks (selects) the article name (self-name) "QQQ" of the menu list D11 on the order menu layout setting screen D shown in FIG. 4B. The processor 141 detects a click operation made by the operator and accepts a selection of the article name "QQQ" in the menu list D11. When the processor 141 accepts the selection of the article name "QQQ", the processor 141 displays the article name "QQQ" of the menu list D11 in color (in gray in FIG. 4B). When the operator operates the addition button D3 or the insertion button D4, the processor 141 detects this operator's operation. When the processor 141 detects an operator's operation on the addition button D3 or the insertion button D4, the processor 141 displays the selected article name (button name) "QQQ", the menu code of the article name "QQQ", and the size of the article thumbnail image name "QQQ" in the layout list D21. In addition, when the operator drags and drops the article name "QQQ" in the layout list D21 to the second place from the top of the layout list D21, the processor 141 detects this operator's operation. The processor 141 arranges (replaces) the menu code of the article name "QQQ", the article name, the size of the thumbnail image at the second position from the top of the layout list D21 in accordance to the detected drag and drop operation. When the operator wishes to terminate the operation to change the layout of the order menu of the articles included in the layout list D21 and determine layout setting of the order menu, the operator clicks the layout change button D7. That is, in Step S6, when the processor 141 detects an operator's operation on the layout change button D7, the processor 141 generates data of the layout list D21 in which the above-mentioned article has been added and the position of the article has been changed. The processor 141 sends the data of the generated layout list D21 (e.g., the layout list D21 shown in FIG. 4B) to the self-order terminal 12 via the communication I/F 145. In contrast, the processor 171 of the self-order terminal 12 receives the data of the layout list D21 from the control station 4 via the communication interface 175 and displays the order menu after layout change on the display 174. That is, the processor 171 displays the order menu screen E on the display 174 in accordance with the data of the layout list D21 as shown in FIG. 5B. The button function of the article name "QQQ" is assigned and the thumbnail image of the article having the article name "QQQ" is laid out in the display area E22 in which the frequency of the touch operation is higher and the number of orders is larger on the menu area E2 of the order menu screen E, for example.

Figure 7A:
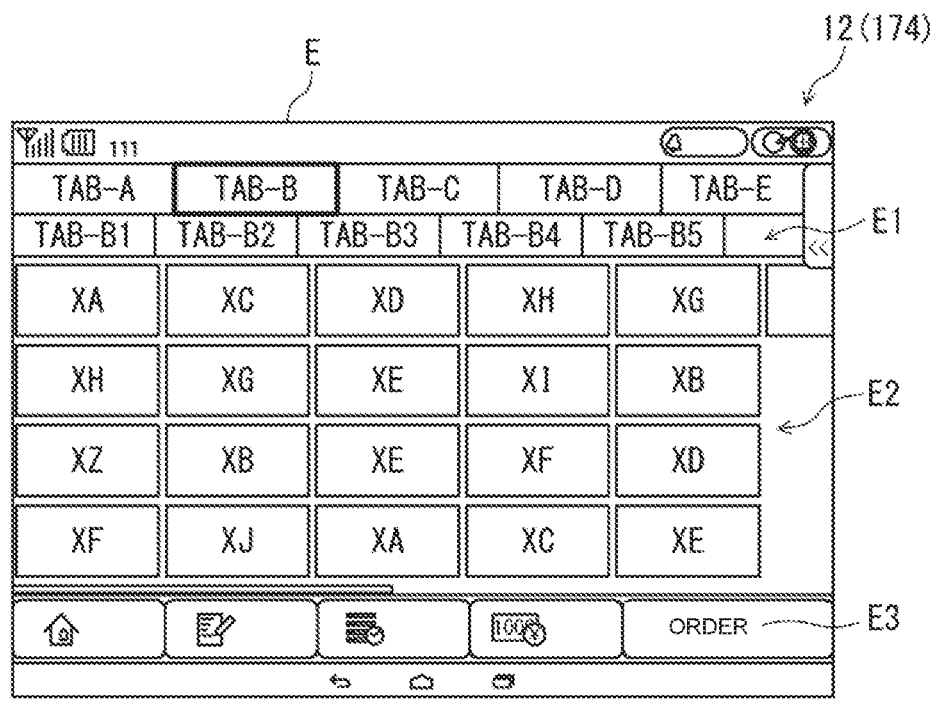
FIG. 7A is a diagram showing an example of order menu layout change in a tiled display format according to the embodiment.
Figure 7B:
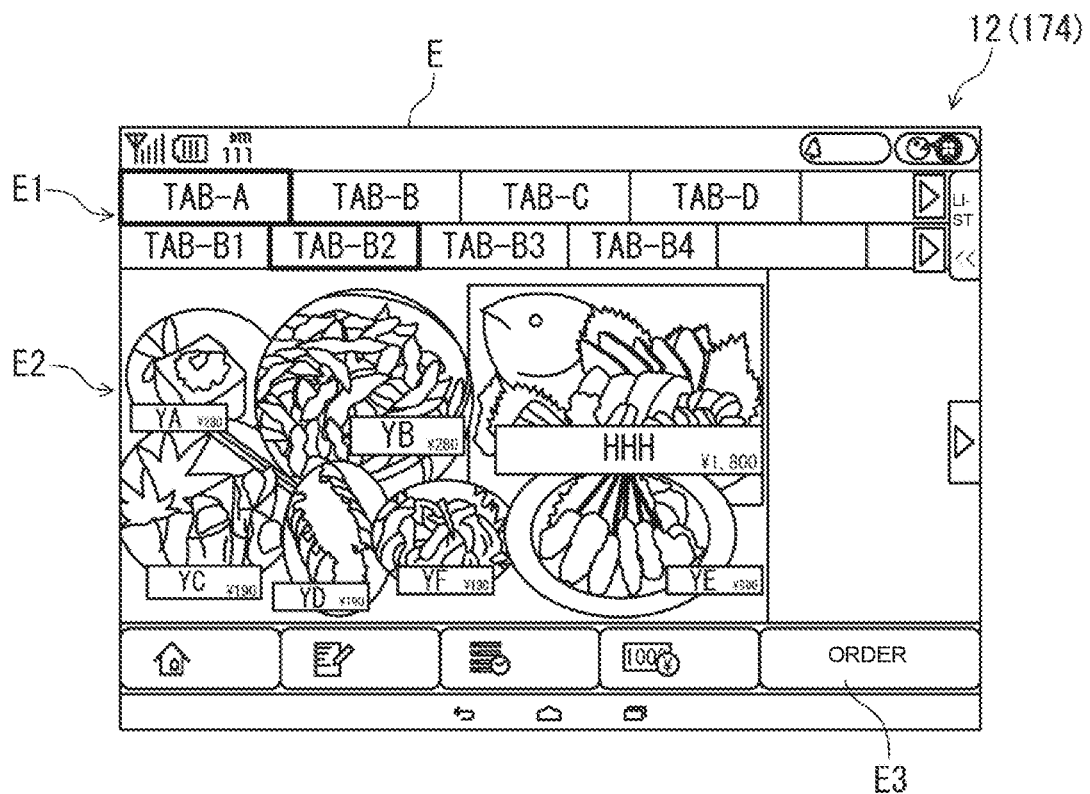
FIG. 7B is a diagram showing an example of order menu layout change in a menu book display format according to the embodiment.

FIGS. 7A and 7B show a layout change example of the order menu. The layout change example of the order menu shown in FIG. 7A is a layout change example in the tiled display format. The layout change example of the order menu shown in FIG. 7B is a layout change example in the menu book display format. Based on the number of customers and the order ratio of food to drinks, the processor 141 of the control station 4 may display a message for recommending to change the layout of the order menu in the message field D6 of the order menu layout setting screen D (presentation of assist information). For example, the processor 131 of the collection server 3 performs statistical processing based on the order information and the operation information and determines an order tendency such as an order ratio. The processor 141 of the control station 4 determines message contents on the basis of a result of statistical processing. For example, the memory 142 of the control station 4 prestores the plurality of example sentences as described above. The processor 141 selects example sentences from the memory 142 and combines the example sentences to generate a message. For example, in a case where a lot of customers come for a party or the like, there are features as follows. Specifically, only drinks are ordered and food is hardly ordered, menu items as a set are first ordered and other menu items are not additionally ordered, or sending is quickly completed after category selection or menu registration, or the operation frequency is higher. The processor 141 of the control station 4 grasps features in such a case on the basis of the above-mentioned result of statistical processing. The processor 141 causes a message saying "Groups of a lot of customers often come, so you are recommended to set a course for a lot of customers" to be displayed in the message field D6 of the order menu layout setting screen D as shown in FIG. 4A, for example.

Moreover, the processor 141 of the control station 4 may display a message for recommending to assign the button function with the charged drinks and the free drinks shown in divided categories in the message field D6. Moreover, in order to increase the order efficiency, the processor 141 of the control station 4 may display a message for recommending to display the menu in the tiled display format in the message field D6. Specifically, for example, regarding the free drinks, the processor 141 causes a message saying "You are recommended to display the menu in the tiled display format" to be displayed in the message field D6 as shown in FIG. 3B. In the tiled display format, the thumbnail images of the free drinks (XA to XI) are not displayed and the select buttons (XA to XI) are displayed in the form of tiles in the menu area E2 of the order menu screen E as shown in FIG. 7A. On the other hand, regarding the charged drinks, the processor 141 may set relatively large thumbnail images and display a message for recommending to perform arrangement to promote orders with visual effects in the message field D6. Moreover, the processor 141 may arrange food menu items in the subordinate category or may arrange an advertisement for charged menu items. In addition, the processor 141 causes a message for recommending to arrange food in a ranking format to be displayed in the message field D6.

Moreover, the processor 141 of the control station 4 may display, on the basis of the operation information, the message for recommending to change the layout of the order menu in the message field D6 (presentation of assist information). For example, in a case where elderly customers often come, there are features as follows. Specifically, the elderly customers tend to come immediately after the opening time, the elderly customers stay for a longer time, menu items with images are relatively often ordered, menu items that can be registered only by a swipe operation to switch the screen are less ordered, or the number of touch operations is extremely small. The processor 141 of the control station 4 grasps features in such a case on the basis of the result of statistical processing. The processor 141 causes a message saying "Elderly customers more often come immediately after the opening time, so you are recommended to set a course for the senior generation and use the menu book display format" to be displayed in the message field D6. The thumbnail images of the articles having the article names "YA" to "YF", "HHH", and the like are displayed in a size such that many articles (menu items) can be contained in one screen in the menu area E2 of the order menu screen E in the menu book display format as shown in FIG. 7B. In this display format, the customer can select desired articles (article names "YA" to "YF", "HHH") even with no swipe operations.

As described above, the control station 4 presents the information for assisting layout setting of the order menu on the order menu layout setting screen D according to the order menu layout setting application. Accordingly, the operator (manager such as a restaurant manager) can optimize the layout of the menu in a manner that depends on a season and/or a time zone on the order menu screen E of the self-order terminal 12. Therefore, the order frequency of a recommended menu item (article), for example, becomes higher and it can contribute to the increase in amount sold. Moreover, the layout of the menu provides display with which customers can easily order, and thus customers can smoothly operate the self-order terminal 12 without stress.

For example, the control station 4 presents articles with a larger number of orders or articles with a larger amount sold to the operator (manager such as a restaurant manager) on the basis of the order information (the number of orders, the amount sold, the order time, or the like). Therefore, the operator can more easily optimize the layout of the menu.

For example, the control station 4 presents the message for recommending to change the layout of the order menu to the operator (manager such as a restaurant manager) on the basis of the order information, the customer information (the number of customers, the entering time, or the like), and the order tendency (the order ratio of food to drinks or the like). Therefore, the operator can more easily optimize the layout of the menu.

For example, on the basis of the operation information of the self-order terminal 12 (touched display area or the like), the control station 4 presents information regarding the display area in which the order frequency is higher on the order menu screen E (display area information) to the operator (manager such as a restaurant manager). Therefore, the operator can more easily optimize the layout of the menu.

For example, the control station 4 presents to the operator (manager such as a restaurant manager) the message for recommending to change the layout of the order menu on the basis of the operation information of the self-order terminal (number of swipe operations or the like). Therefore, the operator can more easily optimize the layout of the menu.

The application of the self-order processing system 1 is not limited to the commercial transaction. The self-order processing system 1 may be applied in a case where purchase and sale of commodities are not involved. For example, the self-order processing system 1 may be applied in services such as use of facilities and lending. Moreover, commercial transaction is not limited to an eating place such as a restaurant.

The self-order processing system 1 may be arranged in a plurality of restaurants. That is, the menu server 2 and the control station 4 are placed in a headquarter that generally manages a plurality of restaurants and the collection server 3, and the self-order terminal 12, and the like are placed at each restaurant. In the headquarter, when the operator (manager such as a restaurant manager) changes the layout of the order menu, the menu screen of the self-order terminal 12 of each restaurant is changed in layout.

It should be noted that in a case where the layout of the order menu has been changed, the layout of all the order menu items of the self-order terminal 12 does not need to be changed. In a case where the layout of the order menu has been changed, only particular order menu items of the self-order terminal 12 may be changed in layout. At the control station 4, the self-order terminal 12 that changes the layout of the order menu may be selectable.

The menu server 2, the collection server 3, and the control station 4 may be individually provided or may be integrated as one or two computers.

Communication between the self-order terminal 12 and other apparatuses is not limited to wireless communication. Wired communication may be employed. Alternatively, wireless communication and wired communication may be mixed. The self-order terminal 12 is not limited to the terminal and is installed at the restaurant. A smartphone or tablet terminal possessed by the customer (user) in which a dedicated application has been installed may be used as the self-order terminal 12.

Regarding the method of presenting the assist information for assist layout setting of the order menu to the operator, it is not limited to displaying the assist information on the display 144 of the control station 4. For example, the assist information may be presented to the operator in such a manner that the printer additionally provided in the control station prints the assist information. That is, the method of presenting the assist information for assisting the layout setting is not limited to displaying the assist information on the display and any method can be employed as long as the assist information can be transmitted to the operator of the control station 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-order processing system, comprising:
a menu server that gathers information regarding articles for sale;
a self-order terminal that displays an order menu on a first display and accepts a user input for an order of an article, the displayed order menu being based on information regarding the articles for sale;
a collection server that receives, from the self-order terminal, information regarding the user input and stores the received information regarding the user input; and
a terminal setting computer that performs layout setting for the order menu displayed on the first display of the self-order terminal, wherein the terminal setting computer includes:
a communication interface that performs data communication with the menu server and the collection server,
a second display that displays an order menu layout setting screen for an operator to perform layout setting for the order menu, the order menu layout setting screen including a menu list, a layout list, and operation buttons permitting the operator to designate articles to be included in the layout list, and
a processor configured to:
acquire the information regarding the articles for sale from the menu server via the communication interface and acquire the information regarding the user input from the collection server via the communication interface,
cause the second display to display the order menu layout setting screen on a basis of the acquired information regarding the articles for sale and the acquired information regarding the user input, the menu list of the order menu layout setting screen including a selectable name of each article for sale, the order of the selectable names being based on the acquired information regarding the articles for sale and the acquired information regarding the user input,
receive operator input selecting a name of an article for sale from the menu list on the order menu layout setting screen,
include the selected name of the article in the layout list of the order menu layout setting screen, the layout list including articles to be displayed on the order menu displayed on the first display, and
cause the second display to present information for assisting the operator in performing the layout setting for the order menu, the information for assisting the operator being presented in conjunction with the order menu layout setting screen on the basis of the acquired information regarding the user input.

2. The self-order processing system according to claim 1, wherein
the information regarding the user input includes information regarding an order of a user, the order being accepted by the self-order terminal, and
the acquired information regarding articles for sale includes the number of previous orders of the article or an amount sold of the article in conjunction with another article.

3. The self-order processing system according to claim 2, wherein
the collection server determines the number of previous orders of the article or the amount sold of the article in conjunction with another article by subjecting the information regarding the order to data analysis, and
the processor of the terminal setting computer acquires the number of previous orders of the article or the amount sold of the article in conjunction with another article from the collection server via the communication interface.

4. The self-order processing system according to claim 3, wherein
the processor of the terminal setting computer is further configured to:
acquire the information regarding the articles for sale from the menu server via the communication interface and generate the menu list to include the acquired information regarding the articles,
sort the menu list on a basis of the number of previous orders of the article or the amount sold of the article in conjunction with another article as acquired from the collection server, and
cause the second display to display the order menu layout setting screen including the sorted menu list.

5. The self-order processing system according to claim 2, wherein
the processor of the terminal setting computer presents a message to the operator recommending an order menu layout change on a basis of the information regarding the order.

6. The self-order processing system according to claim 1, wherein
the first display of the self-order terminal displays an order menu screen including a plurality of display areas in which information regarding a plurality of articles is to be displayed for displaying the order menu, the information regarding the user input includes information regarding an input operation made by the user on the plurality of display areas, and the processor of the terminal setting computer presents information on the order menu layout screen regarding the display area of the plurality of display areas for which order frequency is higher.

7. The self-order processing system according to claim 6, wherein the collection server determines the display area for which the order frequency is higher by subjecting information regarding previous inputs accepted by the self-order terminal to data analysis, and the processor of the terminal setting computer acquires the information regarding the display area for which the order frequency is higher from the collection server via the communication interface.

8. The self-order processing system according to claim 7, wherein the layout list orders display areas on the basis of order frequency.

9. The self-order processing system according to claim 6, wherein the processor of the terminal setting computer presents a message to the operator recommending an order menu layout change on a basis of display area order frequency.

10. A control processing method for a self-order processing system including a menu server that gathers information regarding articles for sale, a self-order terminal that displays an order menu on a first display and accepts a user input for an order of an article, the displayed order menu being based on information regarding the articles for sale, a collection server that receives, from the self-order terminal, information regarding the user input and stores the received information regarding the user input, and a terminal setting computer that performs layout setting for the order menu displayed on the first display of the self-order terminal, the method comprising:

displaying, on a second display of the terminal setting computer, an order menu layout setting screen for an operator to perform layout setting for the order menu, the order menu layout setting screen including a menu list, a layout list, and operation buttons permitting the operator to designate articles to be included in the layout list;

acquiring information regarding the articles for sale from the menu server via a communication interface of the terminal setting computer;

acquiring information regarding the user input from the collection server via the communication interface; and causing the second display to display the order menu layout setting screen on a basis of the acquired information regarding the articles for sale and the acquired information regarding the user input, the menu list of the order menu layout setting screen including a selectable name of each article for sale, the order of the selectable names being based on the acquired information regarding the articles for sale and the acquired information regarding the user input;

receiving operator input selecting a name of an article for sale from the menu list on the order menu layout setting screen;

including the selected name of the article in the layout list of the order menu layout setting screen, the layout list including articles to be displayed on the order menu displayed on the first display; and causing the second display to present information for assisting the operator in performing the layout setting for the order menu, the information for assisting the operator being presented in conjunction with the order menu layout setting screen on the basis of the acquired information regarding the user input.

* * * * *